US007962416B1

(12) United States Patent
Durbin et al.

(10) Patent No.: US 7,962,416 B1
(45) Date of Patent: Jun. 14, 2011

(54) METHOD AND SYSTEM TO REMOTELY ENABLE SOFTWARE-BASED OPTIONS FOR A TRIAL PERIOD

(75) Inventors: Winnie C. Durbin, Dousman, WI (US); Kun Zhang, Waukesha, WI (US); Karamjeet Singh, Germantown, WI (US); Dave Mehring, Sussex, WI (US); Thomas Leroy Lamoureux, Waukesha, WI (US); Hubert A. Zettel, Waukesha, WI (US); Timothy D Butler, Waukesha, WI (US)

(73) Assignees: GE Medical Technology Services, Inc., Pewaukee, WI (US); General Electric Company, Schenectady, NY (US)

( * ) Notice: Subject to any disclaimer, the term of this patent is extended or adjusted under 35 U.S.C. 154(b) by 2261 days.

(21) Appl. No.: 09/681,017

(22) Filed: Nov. 22, 2000

(51) Int. Cl.
G06F 21/00 (2006.01)
G06F 21/22 (2006.01)
H04N 7/16 (2006.01)

(52) U.S. Cl. .................. 705/59; 705/55; 705/56; 726/4; 726/5; 726/28; 726/31

(58) Field of Classification Search ................ 705/1, 50, 705/51, 521, 55, 56, 59, 52, 400; 726/4, 726/5, 28, 31
See application file for complete search history.

(56) References Cited

U.S. PATENT DOCUMENTS

| | | | | |
|---|---|---|---|---|
| 4,486,828 A * | 12/1984 | Kitamura et al. | ............. | 713/155 |
| 4,562,306 A * | 12/1985 | Chou et al. | ..................... | 726/20 |
| 4,652,990 A * | 3/1987 | Pailen et al. | ..................... | 705/56 |
| 4,685,055 A * | 8/1987 | Thomas | .......................... | 705/56 |
| 4,835,682 A * | 5/1989 | Kurachi et al. | ............... | 711/164 |
| 4,888,798 A * | 12/1989 | Earnest | .......................... | 705/54 |
| 5,014,234 A * | 5/1991 | Edwards, Jr. | ................. | 713/200 |
| 5,388,211 A * | 2/1995 | Hornbuckle | .................. | 717/178 |
| 5,400,403 A * | 3/1995 | Fahn et al. | ....................... | 705/51 |
| 5,473,692 A * | 12/1995 | Davis | ............................. | 705/59 |
| 5,490,216 A * | 2/1996 | Richardson, III | ............... | 705/59 |
| 5,495,411 A * | 2/1996 | Ananda | .......................... | 705/32 |
| 5,499,295 A * | 3/1996 | Cooper | ........................ | 380/270 |
| 5,509,070 A * | 4/1996 | Schull | ............................ | 705/54 |
| 5,563,946 A * | 10/1996 | Cooper et al. | .................. | 705/56 |
| 5,638,513 A * | 6/1997 | Ananda | ............................ | 726/5 |
| 5,692,049 A * | 11/1997 | Johnson et al. | ............... | 713/189 |
| 5,715,823 A * | 2/1998 | Wood et al. | ................... | 600/437 |
| 5,737,424 A * | 4/1998 | Elteto et al. | ..................... | 380/28 |
| 5,757,907 A * | 5/1998 | Cooper et al. | .................. | 705/52 |
| 5,784,460 A * | 7/1998 | Blumenthal et al. | ............ | 705/51 |

(Continued)

FOREIGN PATENT DOCUMENTS

JP 8076994 3/1996

(Continued)

*Primary Examiner* — Andrew J. Fischer
*Assistant Examiner* — Christopher C. Johns
(74) *Attorney, Agent, or Firm* — Ziolkowski Patent Solutions Group, SC

(57) ABSTRACT

A system and method to remotely enable software based options for a trial period in remote equipment is disclosed. The invention includes receiving and authenticating a user, and receiving an option-enabling request from the user specifying the particular option requested to be enabled in a particular piece of equipment at a remote location. A system I.D. is validated, and the system ensures that the option has not already been enabled at least once before, and if it has not, a software enabling key is generated and sent to activate the option in the remote equipment.

12 Claims, 2 Drawing Sheets

U.S. PATENT DOCUMENTS

| | | | | |
|---|---|---|---|---|
| 5,956,505 | A * | 9/1999 | Manduley | 713/1 |
| 6,009,401 | A * | 12/1999 | Horstmann | 705/1 |
| 6,044,471 | A * | 3/2000 | Colvin | 713/202 |
| 6,115,471 | A * | 9/2000 | Oki et al. | 380/242 |
| 6,169,976 | B1 * | 1/2001 | Colosso | 705/59 |
| 6,237,114 | B1 * | 5/2001 | Wookey et al. | 714/47 |
| 6,272,636 | B1 * | 8/2001 | Neville et al. | 713/189 |
| 6,301,666 | B1 | 10/2001 | Rive | |
| 6,360,254 | B1 * | 3/2002 | Linden et al. | 709/219 |
| 6,402,737 | B1 * | 6/2002 | Tajima et al. | 606/1 |
| 6,490,684 | B1 | 12/2002 | Fenstemaker et al. | |
| 6,668,375 | B1 * | 12/2003 | Leovac | 717/174 |
| 6,672,505 | B1 | 1/2004 | Steinmetz et al. | |
| 6,725,205 | B1 * | 4/2004 | Weiler et al. | 705/57 |
| 6,834,269 | B1 * | 12/2004 | Bueche | 705/56 |
| 7,007,274 | B1 * | 2/2006 | Patel et al. | 717/176 |
| 7,055,040 | B2 * | 5/2006 | Klemba et al. | 713/156 |
| 7,089,212 | B2 * | 8/2006 | Schull | 705/59 |
| 7,139,737 | B2 * | 11/2006 | Takahashi et al. | 705/59 |
| 7,177,845 | B2 * | 2/2007 | DeTreville | 705/57 |
| 7,240,033 | B2 * | 7/2007 | Kuriya et al. | 705/51 |
| 7,260,557 | B2 * | 8/2007 | Chavez | 705/59 |
| 7,266,203 | B2 * | 9/2007 | Fukawa | 380/286 |
| 7,284,126 | B2 * | 10/2007 | Engel | 713/168 |
| 7,313,828 | B2 * | 12/2007 | Holopainen | 726/29 |
| 7,801,823 | B2 * | 9/2010 | Maeda | 705/64 |
| 2001/0034846 | A1 * | 10/2001 | Beery | 713/201 |
| 2002/0055847 | A1 * | 5/2002 | Nakano et al. | 705/1 |
| 2003/0149667 | A1 * | 8/2003 | Onishi et al. | 705/51 |
| 2004/0025033 | A1 * | 2/2004 | Todd | 713/189 |
| 2004/0030655 | A1 * | 2/2004 | Tanaka et al. | 705/56 |
| 2004/0103064 | A1 * | 5/2004 | Howard et al. | 705/55 |
| 2004/0243821 | A1 * | 12/2004 | Kim et al. | 713/200 |
| 2004/0260654 | A1 * | 12/2004 | Doll-Steinberg | 705/55 |
| 2005/0091166 | A1 * | 4/2005 | Seamans | 705/52 |
| 2005/0246243 | A1 * | 11/2005 | Adams et al. | 705/26 |
| 2006/0064761 | A1 * | 3/2006 | Multerer et al. | 726/27 |
| 2009/0094161 | A1 * | 4/2009 | Kiester et al. | 705/52 |
| 2009/0327137 | A1 * | 12/2009 | Raley et al. | 705/54 |

FOREIGN PATENT DOCUMENTS

| | | | |
|---|---|---|---|
| JP | 10149283 A | | 6/1998 |
| JP | 11306000 | | 11/1999 |
| WO | WO9853384 | * | 11/1998 |
| WO | WO0242899 | * | 5/2002 |

* cited by examiner

METHOD AND SYSTEM TO REMOTELY ENABLE SOFTWARE-BASED OPTIONS FOR A TRIAL PERIOD

BACKGROUND OF INVENTION

The present invention relates generally to an automated system to enable software-based options, and more particularly, to allow remote enablement of such options for a predetermined time period in remotely installed equipment, such as medical diagnostic equipment.

Medical diagnostic equipment and supporting systems, such as medical imaging systems, have become increasing complex in recent years. Examples of such systems include magnetic resonance imaging (MRI) systems, computed tomography (CT) systems, ultrasound and x-ray systems, and positron emission tomography (PET) systems. These systems include many different options, some of which are not enabled based on needs and costs. To add to the complexity of each particular imaging system, many facilities today incorporate a variety of such equipment all of which may not be configured identically. In larger facilities, the systems may be networked to permit common management and control. Further, such systems may be networked with a picture archiving and communication system (PACS) for storing digitized image data for subsequent retrieval and reconstruction. Additionally, teleradiology systems involve transmitting digitized image data to remote locations for review and diagnosis by specialized physicians and/or radiologists.

Because these medical diagnostic systems are used by different facilities with differing needs, not all of these systems operate identically. That is, although identical software may be installed at the factory, certain options are not desired or requested by a customer, and therefore are not enabled. If a customer later wants to add these options to their equipment, service personnel with appropriate training would have to physically travel to the facility where the equipment is present to enable the software in order for the customer to gain access to a particular option.

Improvements in computer networks have greatly facilitated the task of offering assistance to remote facilities with medical imaging equipment. In particular, rather than having to call a service center and talk to a technician or engineer, or await a return call from the service center, network technologies have facilitated proactive techniques wherein the service center may contact the medical diagnostic equipment to directly check the status of subscribing equipment. Further advancements have been proposed to provide remote service to medical diagnostic systems in an effort to provide a level of service on a continual and interactive basis as needed by many facilities. In one such system, a service center can interactively receive messages via a network and can respond automatically to the messages if configured correctly. Data required to analyze the state of operation of the medical diagnostic equipment can be transferred during an electronic connection. This technique greatly facilitates identification of system problems, allows questions to be posed to the subscribing service provider, facilitates transfer of updates and imaging protocols, and permits standard and customized reports to be transmitted to subscribing systems or stations. The interactive aspect of this technique allows the medical diagnostic facility to remain current on services provided by the centralized service facility and to readily communicate with the centralized service facility.

While such advancements in the provision of remote services to medical diagnostic equipment has greatly enhanced the level of service and information exchange, they have not been used to enable options in the equipment.

There is a need for an automated system where a customer, a sales specialist, or a field engineer would have the ability to select, create, download, and install feature options for products that typically have the option software already installed. Many times, these requests will be made by a customer for an extended trial period. It would therefore be desirable to have an expiration period to allow a customer to use the option on a trial basis before purchasing the option.

SUMMARY OF INVENTION

The present invention is directed to a system and method to remotely enable software-based options for a trial period in remotely installed equipment automatically to overcome the aforementioned concerns.

The present invention includes a technique that includes hardware and software to enable such options in remotely installed equipment. Such a system includes a subscribing station that is remote from an on-line center and has at least one in-field product that is controlled by a computer. A communications network connects the on-line center to the subscribing station such that the on-line center is capable of receiving and authenticating a user I.D., validating an option request, and creating an option key in response to the option request. The communications network relays data from the on-line center to the subscribing station and includes a communications portion in the on-line center and in the subscribing station. The communications network connects the on-line center to a subscribing station through an external communications network, such as the Internet, direct dial-up links, or a wireless platform. Once a software option key is generated by the on-line center, the on-line center transmits the option key through the communications network to the subscribing station to enable the option. In one embodiment, the option key is automatically downloaded, installed, and verified. Once operation of the option is verified, an email is sent back to the requestor notifying the requestor that the option is now enabled. In another embodiment, the option key can be emailed or sent through the Internet via the transfer protocol (FTP).

In accordance with the process of the present invention, a method to remotely enable software-enabled options is disclosed that includes receiving a user I.D. at a centralized facility from a user, and receiving an option-enabling request from the user specifying an option requested to be enabled in the equipment at the subscribing station. The method also includes confirming that the option has not already been enabled at the centralized facility and sending an enabling feature from the centralized facility to the equipment in the subscribing station to activate the option in the equipment.

In accordance with another aspect of the invention, a computer program is disclosed which, when executed by a computer, will cause the computer to receive an option-enabling request from a user to request an option be enabled in a medical device located remotely from an on-line center. A system I.D. will be received by the computer program and validated with data from a database at the on-line center. The option-enabling request will then be compared with any other option request for that particular system and rejected if the option-enabling request has previously been enabled. Otherwise, the computer will generate an option key and forward the option key to either the user to manually enable the option, or directly to the medical device to automatically enable the option.

Accordingly, the present invention also includes a computer data signal embodied in a carrier wave and representing a set of instructions which, when executed by a processor, will cause the processor to enable an option in a device by receiving a user I.D. at a centralized facility from a user, and receiving an option-enabling request from the user specifying which option the user requests to be enabled in the particular device at a remote subscribing station. The set of instructions in the computer data signal also includes confirming that the option has not already been enabled, and sending an enabling feature, such as a software key, from the centralized facility to the device in the remote subscribing station for activating the option in the device.

Various other features, objects and advantages of the present invention will be made apparent from the following detailed description and the drawings.

BRIEF DESCRIPTION OF DRAWINGS

The drawings illustrate a preferred embodiment as presently contemplated for carrying out the invention.

In the drawings.

DETAILED DESCRIPTION

Figure 1:
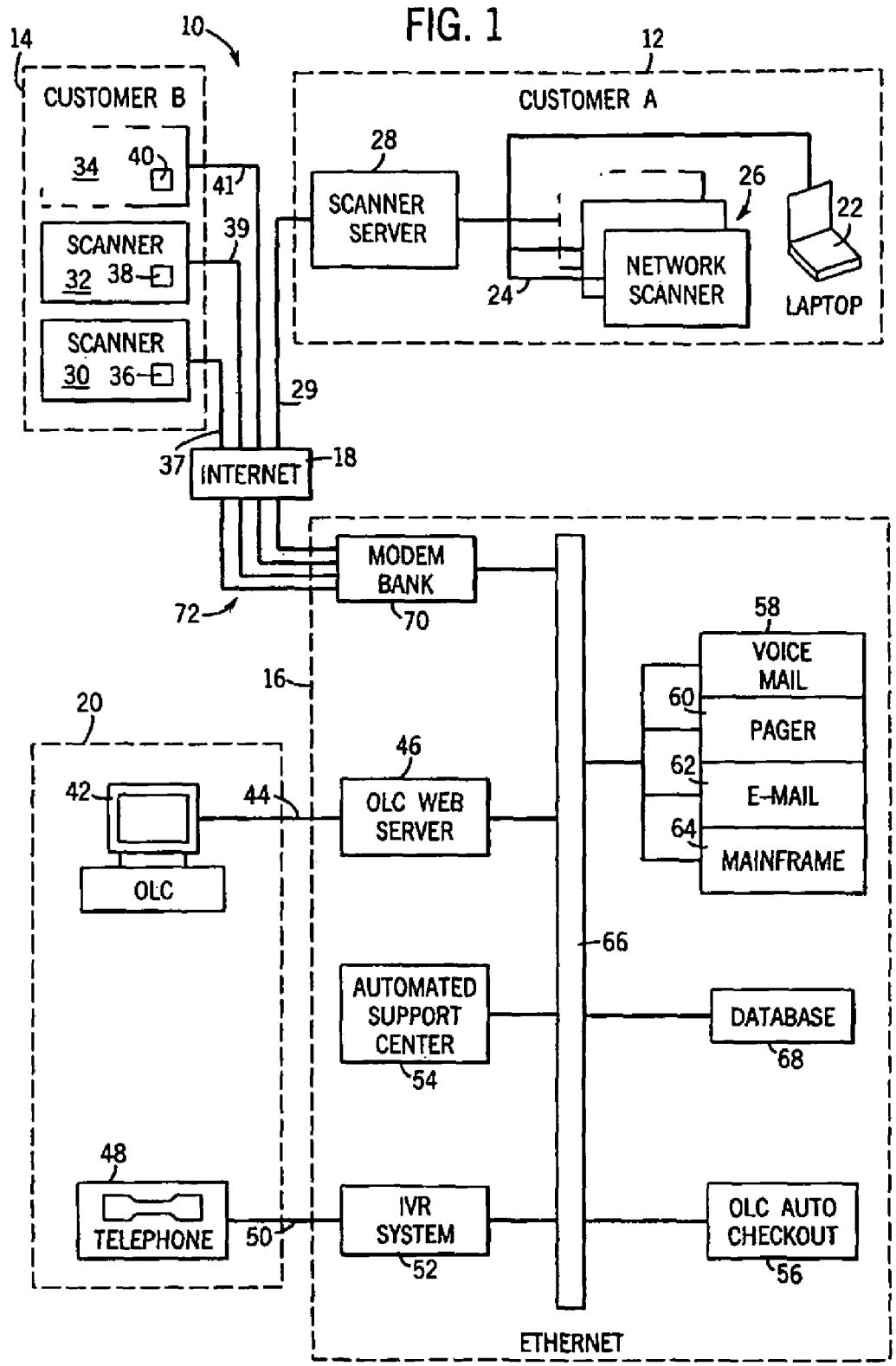
FIG. 1 is a block diagram of a system for which the present invention is implemented therein.

Referring to FIG. 1, an overview block diagram of a medical diagnostic and service networked system 10 is shown which includes a plurality of subscribing stations, such as Customer A referenced with numeral 12, and Customer B referenced with numeral 14. It is understood, that the number of subscribing stations can be limitless, but two specific embodiments are shown with Customer A and Customer B, which will be further explained hereinafter. The subscribing stations 12, 14, are connected to an on-line center 16 through a communications link, such as a network of interconnected server nodes 18 or a remote link 20. Although a single on-line center is shown and described, it is understood that the present invention contemplates the use of multiple on-line centers, each capable of communication with each subscribing station. Each subscribing station has operational software associated therewith which can be configured, serviced, maintained, upgraded, monitored, enabled or disabled by the on-line center 16.

The various systems disclosed are configured to be selectively linked to the on-line center 16 by either the remote link 20, or in the example of subscribing station 12, a laptop computer 22 connected to an internal network 24 of Customer A. Such selective linking is desirable to provide upgrades, maintenance, service, and general monitoring of the various systems and equipment at a customer site, which includes accessing data from the systems and transmitting data to the systems, for example.

In general, a customer site may have a number of in-field products. A subscribing station may include a variety of medical diagnostic systems of various modalities. As an example, in the present embodiment, the in-field products may include a number of networked medical image scanners 26 connected to an internal network 24 served by a single scanner 28 having a workstation configured to also act as a server, or configured as a stand-alone server without a medical image scanner associated therewith. Alternately, a subscribing station, or customer site 14 can include a number of non-networked medical image scanners, 30, 32, 34, each having a computer or work station associated therewith and having an internal modem 36, 38, 40 to connect the subscribing station to a communications link, such as the Internet 18 through links 37, 39, and 41, respectively, to communicate with the on-line center 16. Internet 18 is shown in phantom to indicate that an external communications network can include Internet 18, together with communication links 29, 37, 39 and 41, or alternatively, can include direct dial-up links through dedicated lines, an intranet, or public communications systems.

It is understood that each of the network scanners 26 has its own workstation for individual operation and are linked together by the internal network 24 so that the customer can have a centralized management system for each of the scanners. Further, such a system is provided with communications components allowing it to send and receive data over a communications link 29. Similarly, for the non-networked medical image scanners at subscribing station 14, each of the scanners 30, 32, 34 have individual communications links 37, 39, 41. Although FIG. 1 shows each of these links connected through an open network 18, these links can permit data to be transferred to and from the systems over a dedicated network as well.

The embodiment shown in FIG. 1 contemplates a medical facility having such systems as magnetic resonance imaging (MRI) systems, ultrasound systems, x-ray systems, computed tomography (CT) systems, as well as positron emission tomography (PET) systems, or any other type of medical imaging system, however, the present invention is not so limited. Such facilities may also provide services to centralized medical diagnostic management systems, picture archiving and communications systems (PACS), teleradiology systems, etc. Such systems can be either stationary and located in a fixed place and available by a known network address, or be mobile having various network addresses. In the embodiment shown in FIG. 1, each customer subscribing station 12, 14 can include any combination of the aforementioned systems, or a subscribing station may have all of a single type of system. A customer subscribing station can also include a single medical image scanner. Mobile diagnostic systems can be configured similarly to that of subscribing station 12 or subscribing station 14. Such mobile diagnostic systems can include equipment of various modalities, such as MRI, CT, ultrasound, or x-ray systems and are mobilized in order to service patients at various medical facilities.

The software enablement for trial process and system of the present invention can be initiated by authorized personnel, such as an on-line engineer or technician, or customer administrative personnel from a computer or workstation 42 in the remote link 20, which can be a part of the on-line center 16, or be separately connected to the on-line center 16 by a dialup link 44 to a web server 46 in the on-line center 16. Alternatively, it is contemplated that the system could be initialized by a laptop computer 22 connected to a customer internal network 24, or individually connected to each of the scanners 30, 32, or 34. The remote link 20 also can serve to connect the on-line center 16 to a subscribing station by a telephone and telephone connection 48 through a conventional telephone network 50 and to an interactive voice recognition system (IVR) 52 in the on-line center 16. The on-line center 16 includes a number of processing systems including computers for the IVR system 52, an automated support center 54, and the web server 46. Other processor systems include computers to maintain a voicemail system 58, a pager system 60, an email system 62, and a main frame 64, and more generally, an output report generator and notifier. Each is connectable and can transmit data through a network, such as an ethernet 66 with one another, and/or with at least one database 68. However, it is understood that the single representation of a database in FIG. 1 is for demonstrative purposes only, and it is assumed that there is a need for multiple databases in such a system. It is also understood that the IVR system is not only a voice recognition system, but can also process interactive keypad entry from a touchtone telephone 48. A bank of modems 70 is connected to the ethernet 66 to relay data from the on-line center 16 to the subscribing stations 12, 14 through a plurality of modem links 72.

As previously discussed, each of the systems and substations described herein and referenced in FIG. 1 may be linked selectively to the on-line center 16 via a network 18. According to the present invention, any acceptable network may be employed whether open, dedicated, virtual private, or so forth. The communications links to the network may be of any acceptable type, including conventional telephone lines, fiber optics, cable modem links, digital subscriber lines, wireless data transfer systems, or the like. Each of the systems is provided with communications interface hardware and software of generally known design, permitting them to establish network links and exchange data with the on-line center 16. The systems are provided with interactive software so as to configure the systems and exchange data between the subscribing stations and the on-line center 16. In some cases, during periods when no data is exchanged between the subscribing station and the on-line center, the network connection can be terminated. In other cases, the network connection is maintained continuously.

The present invention includes a method and system for enabling software implemented options in the equipment at the subscribing stations such as 12, 14, from the on-line center 16. As previously indicated, the equipment, including medical imaging devices, would have software installed therein that controls options that are typically enabled or disabled manually by a field engineer on-site. The present invention is directed toward a method and system to remotely enable these options for a trial basis and/or for permanent use. The software enabled options can be enabled by a customer, field engineer, or other authorized personnel with an appropriate user I.D. at the subscribing stations 12, 14, or from the remote link 20. From a centralized facility, such as on-line center 16, after appropriate authentication and validation, a software key is generated in the on-line center 16 and electronically sent via the communication links 29, 37, 39, 41, and/or 72, preferably over the Internet 18, but other public communications systems can work equally well, such as direct dial-up or wireless communications. As previously set forth, it is understood that the external communications links can include a closed intranet system or an open public communications system.

Figure 2:
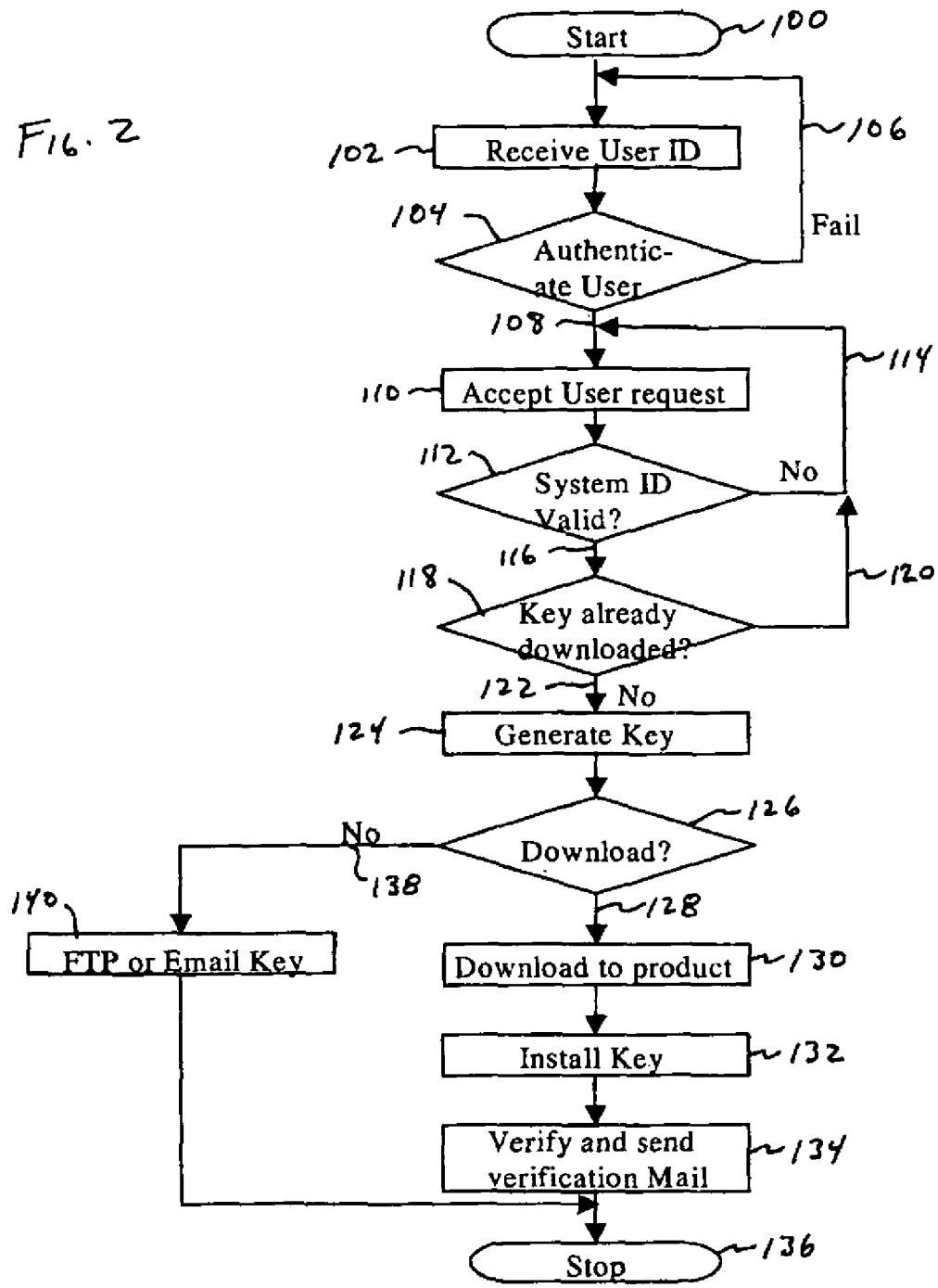
FIG. 2 is a flow chart showing a process of the present invention and implemented in the system of FIG. 1.

Referring to FIG. 2, once the process and/or software is initiated 100, a user I.D. is input by a user, either an authorized field engineer or authorized customer, at the subscribing station or a remote link, which is then sent electronically and received at the on-line center 102. The on-line center then authenticates the user. I.D. 104, and if the user I.D. is not authenticated 106, the user is prompted for a new, valid user I.D. at 102. After a user I.D. is authenticated 104, 108, the user enters the particular option requested and the on-line center receives the user request at 110, together with a system I.D. identifying the particular piece of equipment, such as any of the scanners 26-34. The on-line center then validates the system I.D. at 112, and if the I.D. is not valid 114, the user is prompted to re-enter the data. Once the system I.D. is validated 112, 116, the on-line center then checks to see whether or not a software enabling key has already been generated and downloaded for that particular option at 118. If it has 120, the user is prompted to enter either a different system I.D. or a different option request and the system loops through accepting the user request 110 and validating the system 112. If a software option-enabling key had not been previously downloaded for the option requested on the specific piece of equipment 118, 122, the on-line center generates the software key 124, after which a determination is made as to how to transfer the software key at 126. That is, if the system is so equipped, and automated activation is desired 126, 128, the software key is downloaded to the product/equipment 130 and the software key is automatically installed to activate the option requested 132. The system then automatically verifies the enablement of the option and sends a verification email 134 from the on-line center to the user and/or the subscribing station 134, after which the technique is concluded at 136. Alternatively, if either the field engineer or the user desires to manually install the software key, or if the equipment cannot accept downloaded installation of the software key 126, 138, the software key can be emailed or sent via file transfer protocol 140 to allow the user or field engineer to install the option, after which the process is complete at 136.

Accordingly, the present invention includes a method to remotely enable software enabled options that includes receiving a user I.D. at a centralized facility from a user and receiving an option-enabling request from the user specifying an option requested to be enabled in the particular equipment at a subscribing station. The on-line center, or centralized facility, then confirms that the option has not already been enabled, and if it is not, an enabling feature, such as the software key, is then sent from the centralized facility to the equipment in the subscribing station to activate the option in the equipment. Preferably, the software key enables software that is already installed in the equipment, however, it is within the realm of the present invention that the software can also be sent with the enabling key. The system is designed to enable the option for a predetermined time period to allow the user to experiment with the option before purchasing it.

The invention includes an option-enabling system that includes at least one subscribing station having at least one in-field product, such as a medical imaging scanner, that includes a computer programmed to control the product. The system includes an on-line center capable of receiving and authenticating a user I.D., validating an option request, and creating an option key in response thereto. A communications network connects the on-line center to the at least one subscribing station to relay data. The communications network includes a communications portion in each of the on-line center and the subscribing station and further includes the ability to connect the on-line center to the subscribing station through an external communications network. The system can then transmit the option key from the on-line center to the subscribing station in response to a user I.D. receipt and authorization, and a valid option request receipt.

The invention also includes a computer program which, when executed by a computer, causes the computer to receive an option-enabling request from a user to request an option that is desired to be enabled in a medical device that is located remotely from the on-line center, and receive a system I.D. and validate that system I.D. with data from a database at the on-line center. The computer program then compares the option-enabling request with any other option request for that system I.D. in the database at the on-line center and rejects the option-enabling request if the comparison results in a predefined number of matches. Preferably, if there is one match, that indicates the user has already tried that option on that particular piece of equipment, and is locked out from attempting another trial. If there are no matches, the computer program generates a software option key and forwards that option key to either the user for manual installation, or directly to the medical device to automatically enable the option.

Accordingly, the invention also includes a computer data signal embodied in a carrier wave and representing a set of instructions which, when executed by at least one processor, causes the processor to enable an option in a device by receiving a user I.D. and an option-enabling request at a centralized facility from a user specifying an option requested to be enabled in the device at a subscribing station, and then confirming that the option has not already been enabled. If it has not already been enabled, an enabling feature is sent via the computer data signal from the centralized facility to the device in the subscribing station to activate the option in the device.

Preferably, the software option key is generated with an embedded time or date stamp that controls an expiration period of the option. When that time or date is reached, the option is automatically disabled. It is also contemplated that the present invention will be capable of generating multiple keys for multiple product applications to enable options on multiple products with a single run through by a user.

The present invention has been described in terms of the preferred embodiment, and it is recognized that equivalents, alternatives, and modifications, aside from those expressly stated, are possible and within the scope of the appending claims.

What is claimed is:

1. An option-enabling system comprising:
   a subscribing station including:
      a central server;
      a plurality of in-field products networked to the central server; and
      a computer separate from the central server and the plurality of in-field products that is programmed to control a transfer of data to and from the plurality of in-field products so as to function as a centralized management system there for;
   an on-line center programmed to receive and authenticate a user I.D., validate an option request for at least one of the plurality of in-field products, and create an option key in response to the option request; and
   a communications network to relay data from the on-line center to the subscribing station, the communications network including a first component in the on-line center and a second component in the subscribing station, and wherein the communications network is programmed to connect the on-line center to the subscribing station through an external communications network and transmit the option key from the on-line center to the subscribing station in response to receipt and authorization of a user I.D., and receipt of a valid option request;
   wherein the computer at the subscribing station transmits each of the user I.D. and the option request for a specified in-field product to the on-line center by way of the central server and the communications network; and
   wherein the computer at the subscribing station installs the option key on the specified in-field product.

2. The system of claim 1 further comprising a computer within the on-line center programmed to:
   receive a user I.D. at the on-line center from a user and validate the user I.D.;
   receive an option request from the user;
   if the user I.D. is validated, receive a system I.D. and validate the system I.D.;
   if the system I.D. is validated, check whether the option requested was previously enabled; and
   if the option requested was not previously enabled, enable the option requested.

3. The system of claim 2 wherein the computer within the on-line center is further programmed to generate an option key specific to the system I.D.

4. The system of claim 3 wherein the computer within the on-line center is further programmed to:
   download and install the option key in medical equipment at the subscribing station; and
   verify option enablement in the medical equipment.

5. The system of claim 4 wherein the computer within the on-line center is further programmed to send an electronic verification of the option enablement.

6. The system of claim 1 wherein the plurality of in-field products includes at least one medical imaging device.

7. The system of claim 3 wherein the computer within the on-line center is further programmed to transmit the option key to a user identified by the user I.D. via one of an FTP or an email so as to allow the user to manually enable the option.

8. The system of claim 3 wherein the computer within the on-line center is further programmed to generate the option key with a disablement feature to disable the option after a predetermined time period.

9. A method for enabling an option in a device comprising:
   receiving a user I.D. at a centralized facility;
   receiving an option-enabling request specifying an option requested to be enabled in the device at a subscribing station, the subscribing station including a central server, a plurality of in-field products networked to the central server, and a computer separate from the central server and the plurality of in-field products that is programmed to control a transfer of data to and from the plurality of in-field products so as to function as a centralized management system there for;
   confirming that the option has not already been enabled; and if not,
   generating an enabling feature at the centralized facility upon confirmation that the option has not already been enabled, the enabling feature comprising software to be installed in the device;
   sending the enabling feature from the centralized facility to the device in the subscribing station by way of a communications network, the communications network including a first component at the centralized facility and a second component at the subscribing station; and
   installing the software so as to enable the option in the device.

10. The method of claim 9 wherein the device includes medical imaging scanners and further includes designing a software key to enable the option in the medical image scanner for a predetermined trial period.

11. The method of claim 9 further comprising:
    authenticating the user I.D. after receiving the user I.D. at the centralized facility; and
    wherein sending the enabling feature includes downloading the enabling feature to the equipment and remotely enabling the feature automatically and without further user input.

12. The system of claim 1 wherein the option key includes therein software to be installed on a specified in-field product.

* * * * *